United States Patent Office 3,161,676
Patented Dec. 15, 1964

3,161,676
PREPARATION OF SUBSTITUTED ALKYL UREAS
Phillip Adams, Murray Hill, N.J., assignor to Berkeley Chemical Corporation, Berkeley Heights, N.J., a corporation of New Jersey
No Drawing. Filed May 21, 1962, Ser. No. 196,514
8 Claims. (Cl. 260—553)

This invention relates to new and useful improvements in the preparation of substituted alkyl ureas. Substituted alkyl ureas find increasing use as intermediates for pharmaceuticals and other organic chemicals.

The preparation of substituted alkyl ureas by various reported techniques either gives products that can be separated or purified with difficulty or requires reactants that are difficult to obtain.

It has now been found that substituted alkyl ureas can be prepared by reacting a carbamic acid ester with primary and sterically unhindered secondary aliphatic amines. The equation for the reaction is illustrated below:

$$R_1R_2NH + R_3NHCOOR_4 \rightarrow R_1R_2NCONHR_3 + R_4OH$$

The primary and sterically unhindered secondary aliphatic amines have the formula: $R_1R_2NH$, wherein $R_1$ and $R_2$ are radicals selected from the group consisting of H, alkyl and cycloalkyl radicals which can be the same or different with a maximum of one radical being H. The amines are higher boiling than the evolved alcohol. Typical examples of the amines are shown in Table I.

The carbamic acid esters have the formula:

$$R_3NHCOOR_4$$

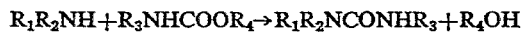

wherein $R_3$ is a radical selected from the group consisting of H, alkyl, cycloalkyl, and aryl radicals and $R_4$ is a lower alkyl radical whose alkanol is lower boiling than the amine reactant. It is significant that mono- but not di-substituted, on the nitrogen esters, can be used in the reaction. $R_4$ is a lower alkyl radical having from 1 to 12 carbon atoms with methyl preferred. Typical examples of these materials are also shown in Table I.

The substituted alkyl ureas thus have the formula:

$$R_1R_2NCONHR_3$$

The reactants are employed in about stoichiometric amounts. Temperatures in the range of about 110° to 160° C. are utilized with 120°–135° C. preferred with pressures necessary to maintain the temperature.

Inert organic diluents such as, e.g., naphtha, xylene, and chlorobenzene can be employed.

A minor amount of a metal compound Lewis acid catalyst is employed such as dibutyl tin oxide, cupric acetate, stannic chloride, stannous oxalate, aluminum alkoxide, and alkyl tin oxides. The catalyst is used in an amount from about 0.05–1.0 wt. percent based on amine.

This invention, product work-up, and its advantages will be better understood by reference to the following examples:

*Example 1*

A mixture of amine (1.0 moles), methyl carbamate (1.2 moles), dibutyl tin oxide (1–2 g.) and xylene were heated to 120°–130° C. The methanol formed was separated from the solvent and amine by using a fractionating column. Upon cooling, the product crystallized.

Above 135° C., the formation of symmetrical dialkyl ureas, derived from the amine used, lowered the purity of the desired product. When the urea melted below 100° C., no solvent was necessary, and vacuum was used to maintain the distillation conditions. Usually, ten parts of a xylene-naphtha (30–50% xylene) mixture was used as the solvent. The solvent composition was determined by the solubility of the product in it.

A 53% yield of n-hexyl urea was obtained when the methanol was left in the system. By distilling the methanol as formed, a 96% yield was obtained.

The experimental results are summarized in Table I. The M.P.'s and analysis are reported for samples recrystallized once from xylene-naphtha solvent. Similar results are obtained from other suitable solvents and catalysts.

TABLE I

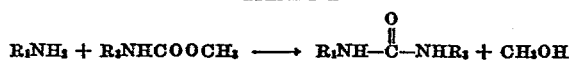

| Amine | $R_3$ | Percent Yield | M.P. | M.P. (lit.) | Calc. | Nitrogen, Fnd. |
|---|---|---|---|---|---|---|
| n-Butyl | H | 58 | 96–97 | 96 | 24.14 | 24.00 |
| Iso-amyl |  | 75 | 90.5–91.5 | 94 | 19.44 | 18.93 |
| n-Hexyl |  | 96 | 109.5–110.0 | 109.5 | 19.44 | 19.23 |
| n-Octyl |  | 78 | 99–100 | 102.5 | 16.28 | 16.31 |
| n-Dodecyl |  | 93 | 103.2–104.2 | 107 | 14.0 | 13.66 |
| n-Hexadecyl |  | 89 | 103.8–104.8 | 108 | 10.9 | 10.68 |
| n-Octadecyl |  | 92 | 108–110.5 | 111.5 | 9.86 | 9.93 |
| 2-ethylhexyl |  | 81 | 84–86 | 77–79 | 16.28 | 15.92 |
| Cyclohexyl |  | 90 | 194–196 | 195–196 | 19.86 | 19.70 |
| Benzyl |  | 85 | 150–51 | 147–7.5 | 18.67 | 18.65 |
| Phenethyl |  | 81 | 112.0–113.5 | 115–116 | 17.07 | 17.12 |
| 3-methyoxypropyl |  | 90 | 70.5–71.5 |  | 21.21 | 20.72 |
| Piperidine |  | 88 | 106–107 | 105–106 | 21.71 | 21.56 |
| Morpholine |  | 86 | 111–112 | 109–110 | 21.37 | 21.07 |
| Cyclohexyl | n-Propyl | 88 | 106–107 |  | 15.22 | 15.22 |
| n-Hexyl | n-Propyl | 95 | 52.5–53.5 |  | 15.05 | 14.89 |
| Morpholine | n-Propyl | 90 | 127.5–128.5 |  | 15.64 | 15.95 |
| Cyclohexyl | n-Butyl | 91 | 115–116.5 | 105 | 14.14 | 13.99 |
| n-Hexyl | Phenyl | 85 | 72–73 |  | 12.73 | 12.63 |
| Cyclohexyl | Phenyl | 99 | 187.5–189 | 192 | 12.84 | 12.82 |

The advantages of this invention will be apparent to those skilled in the art. Among these are high yields, ready product recovery, and readily obtainable economic reactants.

It is to be understood that this invention is not limited to the specific examples which have been offered merely as illustrations, and that modifications can be made without departing from the spirit thereof.

What is claimed is:

1. A process for preparing a substituted alkyl urea having the formula:

$$R_1R_2NCONHR_3$$

which comprises reacting, at a temperature in the range of about 110–160° C., in the presence of a metal compound Lewis acid catalyst selected from the group consisting of aluminum alkoxides, alkyl tin oxides, cupric acetate, stannic chloride and stannous oxalate an amine having the formula:

$$R_1R_2NH$$

wherein $R_1$ and $R_2$ are radicals selected from the group consisting of H, alkyl and cycloalkyl radicals, with a maximum of one radical being H, with a carbamic acid ester having the formula:

$$R_3NHCOOR_4$$

wherein $R_3$ is a radical selected from the group consisting of H, alkyl, cycloalkyl, and aryl radicals, and $R_4$ is an alkyl radical having from 1 to 12 carbon atoms and derived from an alkanol lower boiling than the amine reactant, the catalyst being used in an amount of from about 0.05–1.0 weight percent, based on amine, and recovering the alkyl urea.

2. The process of claim 1 in which the catalyst is dibutyl tin oxide.

3. The process of claim 2 in which the ester is methyl carbamate.

4. The process of claim 3 in which the amine is n-butyl amine.

5. The process of claim 3 in which the amine is isoamyl amine.

6. The process of claim 3 in which the amine is n-hexyl amine.

7. The process of claim 3 in which the amine is n-octyl amine.

8. The process of claim 3 in which the amine is n-dodecyl amine.

References Cited in the file of this patent

UNITED STATES PATENTS

| | | |
|---|---|---|
| 2,226,835 | Rohm | Dec. 31, 1940 |
| 2,288,422 | Rohm | June 30, 1942 |

OTHER REFERENCES

Fieser: Org. Chem., third ed., 1956, pp. 138 and 537.

Noller Chem. of Org. Cpds., second ed., 1957, pp. 236–37.

Topchiev et al.: Boron Fluoride and Its Compounds as Catalysts in Org. Chem. (1959), pp. 64–5, 70 and 78.

Steinbrunn et al.: German application 1,055,287, printed April 16, 1959 (K451 19/02).